United States Patent [19]

Carter

[11] 4,006,724
[45] Feb. 8, 1977

[54] ARRANGEMENT FOR MOUNTING ELECTRONIC CIRCUIT BOARDS ON AN ENGINE-AIR INTAKE STRUCTURE

[75] Inventor: Ivor W. Carter, Grosse Pointe Woods, Mich.

[73] Assignee: Chrysler Corporation, Highland Park, Mich.

[22] Filed: Mar. 18, 1976

[21] Appl. No.: 668,026

Related U.S. Application Data

[63] Continuation of Ser. No. 582,465, May 30, 1975, abandoned.

[52] U.S. Cl. .................. 123/198 E; 123/1 R; 123/198 R; 123/148 E; 55/DIG. 28
[51] Int. Cl.² .......................... F02B 77/00
[58] Field of Search ........... 123/198 E, 198 R, 1 R, 123/148 E, 146.5 A, 117 R; 55/DIG. 28, 510

[56] References Cited

UNITED STATES PATENTS

| | | | |
|---|---|---|---|
| 3,428,033 | 2/1969 | Watts | 123/146.5 A |
| 3,452,521 | 7/1969 | Remock | 55/510 |
| 3,678,912 | 7/1972 | Heisler | 55/DIG. 28 X |
| 3,722,275 | 3/1973 | Rodely et al. | 123/198 R UX |
| 3,811,419 | 5/1974 | Eckert | 55/DIG. 28 X |
| 3,882,951 | 5/1975 | Conley | 123/198 E X |
| 3,907,946 | 9/1975 | Brown | 55/DIG. 28 X |

Primary Examiner—C. J. Husar
Assistant Examiner—Ira S. Lazarus
Attorney, Agent, or Firm—Talburtt & Baldwin

[57] ABSTRACT

An electronic engine control system for an internal combustion engine has at least a portion of its circuitry mounted on circuit boards which are disposed generally in the path of induction air drawn into the engine via the engine air filter housing. The circuit boards are mounted within a molded plastic circuit board mounting housing which is disposed over openings in the sidewall of the sheet metal air filter housing and which is removably mounted thereon by means of attaching screws. An inlet snorkel via which induction air is drawn into the air filter housing is a molded plastic element secured to the circuit board mounting housing with the circuit board mounting housing being disposed between the snorkel and the air filter housing.

18 Claims, 2 Drawing Figures

ARRANGEMENT FOR MOUNTING ELECTRONIC CIRCUIT BOARDS ON AN ENGINE-AIR INTAKE STRUCTURE

This is a continuation of application Ser. No. 582,465, filed May 30, 1975, now abandoned.

BACKGROUND AND SUMMARY OF THE INVENTION

This invention relates to a novel arrangement for mounting electronic circuit components in the engine compartment of a vehicle and in particular to a novel arrangement for mounting the circuit boards on the engine air filter housing.

Among the features and objects of the present invention are to provide an improved mounting arrangement for electronic circuit boards containing engine control circuitry: which can be easily assembled into and disassembled from an engine air filter housing; in which the circuit components are well protected; in which the circuit components are exposed to cooling via the induction air drawn into the air filter housing; which provides easy connectability with system components located outside the air filter housing; which provides an advantageous construction; and which offers other benefits and advantages as will appear more fully hereinafter in the detailed description.

BRIEF DESCRIPTION OF THE DRAWING

The drawing illustrates a preferred embodiment of the present invention according to the best mode presently contemplated in carrying out the invention.

DESCRIPTION OF THE PREFERRED EMBODIMENT

Figures 1, 2:
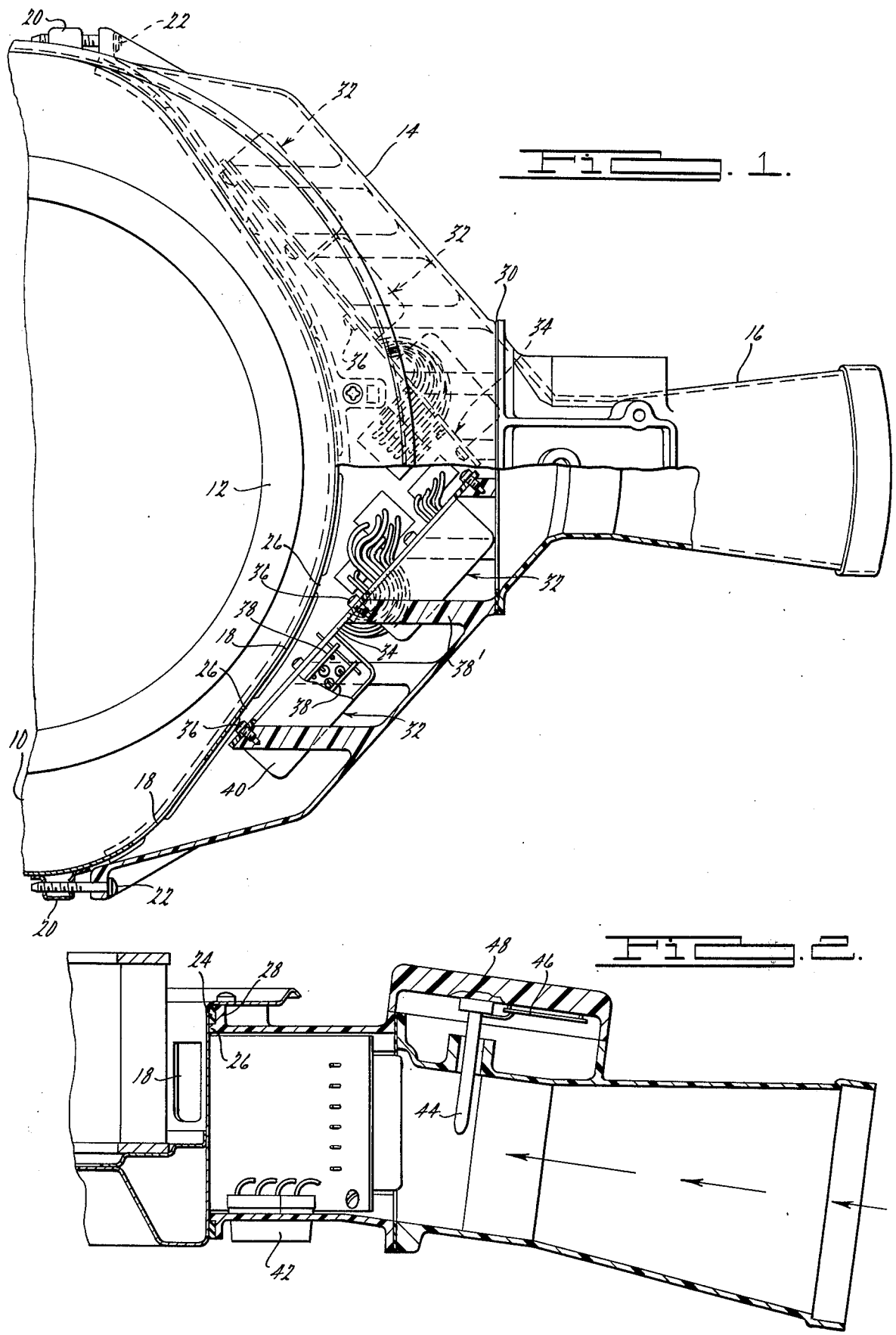
FIG. 1 is a plan view having portions broken away of an arrangement for mounting electronic circuit boards on the engine air filter housing according to principles of the present invention.
FIG. 2 is a longitudinal sectional view through the arrangement of FIG. 1.

The drawing illustrates a sheet metal air filter housing 10 of generally cylindrical shape, a cylindrical annular air filter 12 contained within housing 10, a plastic circuit board mounting housing 14 and a moulded plastic intake snorkel 16. Housing 10 and filter 12 are generally of conventional construction and mount on the engine in the usual fashion; however, in accordance with principles of the present invention certain modifications may be made to the housing 10 which include the provision of one or more openings 18 formed in the side wall of the housing, a plurality of attaching brackets 20 for attachment of circuit board housing 14, and the height of the side wall of the housing 10 may be somewhat increased. The cover for housing 10 has not been shown in the drawing in the interest of clarity.

Housing 14 is of generally concave shape extending circumferentially of housing 10 and disposed over the openings 18. Housing 14 attaches to housing 10 by means of attachment screws 22 which are threaded into brackets 20. An annular sealing gasket 24 seals between the two housings and is compressed to a limited extent when the screws 22 are tightened to draw the housing 14 against housing 10. A leak-proof seal is attained by providing a plurality of individual protuberances such as 26 at locations around the inner edges of the upper and lower walls of housing 14. With this arrangement, when the screws 22 are tightened the gasket 24 will be controllably compressed with the compression thereof being limited by the protuberances 26 abutting the wall of the air filter housing 10. A continuous backup flange 28 is provided for gasket 24. The radially outer edge of housing 14 terminates in an opening over which snorkel 16 is disposed. Snorkel 16 is a tubular element and its inner periphery is provided with a flange which abuts the radially outer periphery of housing 14 and the two elements 14 and 16 are secured together by any suitable securing means. Desirably, a sealing gasket 30 may be provided between the two. When the engine is operated induction air is drawn through snorkel 16 and housing 14, through openings 18 and through air filter 12 into the engine carburetor to be mixed with fuel for combustion in the engine.

The invention provides within housing 14 the mounting of electronic circuitry which is associated with a control system for the engine, for example electronic fuel metering controls, electronic spark timing controls, or electronic fuel injection controls. The circuitry in the illustrated embodiment is contained in a number of individual electronic circuit modules 32 of the plug-in type which plug into electronic circuit boards 34 which are removably secured within housing 14. The two circuit boards 34 are removably mounted on housing 14 by means of attaching screws 36 which pass through openings in the boards to engage threadedly threaded holes in molded structural ribs 38' which are integrally formed in housing 14. The modules 32 removably mount on boards 34 by means of plug-in type terminals. The modules 32 may contain individual electronic circuit boards 38 having individual circuit components thereon, the boards 38 being potted by means of suitable potting material within sheet metal receptacles 40. Lead wires from the circuit boards 34 terminate in connector plugs 42 which mount in the bottom wall of housing 14. Plugs 42 are mateable with matching connector plugs (not shown) to effect connection of the circuits on the boards with additional portions of the system which are located exteriorly of housing 14. Internal connections between the individual modules and circuit boards can be accomplished by internal connections. The location of modules 32 within housing 14 is such that adequate clearance is provided to permit induction air to pass freely into the engine without appreciable obstruction while at the same time exposing the circuit components to the conductive cooling afforded by the induction air. Thus, even in the hot environment of an underhood engine compartment, the electronic circuit components can be maintained in a thermal environment which is not detrimental to the circuit components. A further system component 44 is shown disposed on snorkel 16 and extending through an opening in the snorkel to be disposed in the path of travel of the induction air. This element could be any of a number of possible devices and is illustratively shown as a probe for monitoring the velocity of intake air flow through snorkel 16. An electronic circuit module 46 is contained in association with element 44 within a cover 48 which mounts on snorkel 16.

The invention provides an advantageous mounting arrangement for circuit components which excellently accomplishes the above-noted features. It will be appreciated that various configurations are contemplated within the scope of the invention and that the preferred embodiment is to be considered in an illustrative and not a limiting sense.

What is claimed is:

1. In an engine powered vehicle having an induction air intake system for the engine including an air filter housing and including electronic engine control circuitry, the improvement comprising: means mounting at least portions of said control circuitry on a circuit board, and
means mounting said circuit board on said air filter housing in the path of induction air drawn into said air filter housing by the engine.

2. The improvement according to claim 1 wherein said circuit board is contained within a circuit board mounting housing disposed over one or more openings in a side wall of said air filter housing.

3. The improvement according to claim 2 including an intake snorkel via which air is inducted into said air filter housing, said circuit board mounting housing being disposed between said snorkel and said air filter housing.

4. The improvement according to claim 3 wherein said snorkel and said circuit board mounting housing are separate plastic elements secured together.

5. The improvement according to claim 1 including a receptacle and means potting said circuit board in said receptacle.

6. The improvement according to claim 5 wherein said circuit board and receptacle mount on a second circuit board which is also disposed in the path of induction air drawn into said air filter housing by the engine, said circuitry portion on said first-mentioned circuit board being electrically connected with said second circuit board.

7. The improvement according to claim 6 including connector plug means connected electrically with said second circuit board and via which external connections of said circuitry portions on said first-mentioned circuit board are effected.

8. In an engine powered vehicle comprising an induction air intake system for the engine including an air filter housing and comprising electronic engine control circuitry, the improvement comprising:
means mounting at least a portion of said control circuitry on a circuit board; and
means mounting said circuit board and said control circuitry thereon on said air filter housing in the path of induction air drawn into the engine via said air intake system.

9. The improvement according to claim 8 wherein said induction air intake system comprises intake means attached to and leading from said air filter housing via which air for the engine is inducted into said housing, and thence into the engine, and said circuit board and said control circuitry portion thereon are disposed within said intake means.

10. The improvement according to claim 9 wherein said intake means comprises a circuit board mounting housing disposed over one or more openings in said air filter housing, and attached thereto, and containing said circuit board and said control circuitry portion thereon.

11. The improvement according to claim 10 wherein said intake means further comprises a snorkel attached to said circuit board mounting housing and disposed such that air inducted by the engine passes through said snorkel, then through said circuit board mounting housing, and then through said air filter housing.

12. The improvement according to claim 8 wherein said induction air intake system includes intake structure attached to said air filter housing through which induction air enters said housing and said last-mentioned means includes a portion of said intake structure.

13. In an engine powered vehicle comprising induction air intake structure including an air filter housing and intake means leading from said air filter housing via which air for the engine is inducted into said housing, and thence into the engine, and comprising electronic control circuitry, the improvement comprising:
means mounting at least a portion of said control circuitry on a circuit board; and
means mounting said circuit board and said control circuitry portion thereon on said intake means in the path of induction air drawn therethrough.

14. The improvement according to claim 13 wherein said intake means comprises a circuit board mounting housing containing said circuit board and said control circuitry portion thereon.

15. The improvement according to claim 14 wherein said circuit board mounting housing is disposed over one or more openings in said air filter housing and is attached thereto.

16. In an engine powered vehicle comprising induction air intake structure via which air is inducted into the engine and comprising electronic engine control circuitry, the improvement comprising:
means mounting at least a portion of said control circuitry on a circuit board; and
means mounting said circuit board and said control circuitry portion thereon on a selected portion of said induction air intake structure with said circuit board and said control circuitry portion disposed in the path of induction air inducted into the engine via said induction air intake structure.

17. The improvement according to claim 16 wherein said induction air intake structure comprises an air filter housing and intake means leading from said air filter housing, said circuit board and said control circuitry portion thereon being disposed in said intake means.

18. The improvement according to claim 17 wherein said intake means comprises a circuit board mounting housing containing said circuit board and said control circuitry portion thereon.

* * * * *